United States Patent [19]

Okuhara et al.

[11] Patent Number: 5,674,082

[45] Date of Patent: Oct. 7, 1997

[54] ROTARY CONNECTOR DEVICE

[75] Inventors: Takeshi Okuhara; Kazumi Honjo; Hiroshi Ohishi; Fujio Kitayama, all of Tokyo, Japan

[73] Assignee: Niles Parts Co., Ltd., Japan

[21] Appl. No.: 542,461

[22] Filed: Oct. 12, 1995

[30] Foreign Application Priority Data

| Feb. 21, 1995 | [JP] | Japan | 7-56607 |
| Feb. 21, 1995 | [JP] | Japan | 7-56608 |
| Feb. 21, 1995 | [JP] | Japan | 7-56609 |
| Feb. 21, 1995 | [JP] | Japan | 7-56611 |
| Feb. 21, 1995 | [JP] | Japan | 7-56612 |

[51] Int. Cl.⁶ ............................................. H01R 3/00
[52] U.S. Cl. ............................................. 439/164; 439/15
[58] Field of Search ............................. 439/164, 15, 3

[56] References Cited

U.S. PATENT DOCUMENTS

| 3,997,224 | 12/1976 | Ogawa et al. | 439/3 |
| 4,921,628 | 5/1990 | Sasaki et al. | 439/15 |
| 5,059,134 | 10/1991 | Schaher et al. | 439/164 |
| 5,120,234 | 6/1992 | Mergless | 439/680 |
| 5,226,831 | 7/1993 | Horiuchi | 439/164 |
| 5,256,075 | 10/1993 | Miyahara | 439/164 |
| 5,286,219 | 2/1994 | Ueno et al. | 439/15 |

FOREIGN PATENT DOCUMENTS 454714   12/1992   Japan.

*Primary Examiner*—Neil Abrams
*Assistant Examiner*—T. C. Patel
*Attorney, Agent, or Firm*—Ronald P. Kananen

[57] ABSTRACT

A rotary connector device having a stator housing 1 and a rotor housing 2 connected by an attachment 3. The attachment 3 fits to the rotor housing 2 and rotatably supports the stator housing 1. The attachment 3 includes a grease reservoir 33 disposed in sliding contact with the stator housing 1. An opening 25, through which a cord 61 connected to a flexible cable 4 is pulled outside, is disposed in the upper part of a rotor housing 2. The opening has a plurality of bumps 251 to 254 to clamp the cord 61. The stator housing 1 is constructed by assembling a side housing 11 and a bottom housing 12 together. A first gap 13 is formed in the area where the side housing 11 is connected to the bottom housing 12. A first side edge 71 of a slide sheet 7 is inserted into the first gap 13. A guide 15 of the bottom housing 12 for guiding the flexible cable 4 is formed with a second gap 14 into which the second side edge 72 of the slide sheet 7 is inserted. Respective base ends 112, 122 of the side housing 11 and the bottom housing 12 are aligned with each other in a plane, and the bottom housing 12 has a fitting claw 121 interfitted into a fitting hole 111 of the side housing 11. The rotor housing 2 has a contact portion 27 on the side facing the stator housing 1 inclined at a predetermined angle defining a tapered gap.

9 Claims, 4 Drawing Sheets

ROTARY CONNECTOR DEVICE

BACKGROUND OF THE INVENTION

1. Field of the Invention

This invention relates to an improvement of a rotary connector device for supplying power to an air bag, etc., disposed at a pad portion of a steering wheel of a car, for example.

2. Description of the Prior Art

Recently, a technique of protecting passengers from impact by inflating an air bag in the event of car accident has been put into practical application. To inflate the air bag, particularly one disposed at a pad portion of a steering wheel, power must be supplied to an inflator from the chassis through a rotary portion of the steering wheel. Known means for supplying power include one which uses a slip ring, and another which uses a reeled flexible cable as in the rotary connector device in the present invention.

Various proposals have been made in the past for this kind of rotary connector device. For example, Japanese Utility Model Publication No. 54714/1992 discloses a rotary connector device that includes a stator housing, a rotor housing rotatably fitted to the stator housing, and a reeled flexible cable stored in the space defined by both housings, and which further includes a guide (peripheral wall) for guiding the end of the flexible cable into the space and an attachment (rotary ring) for interconnecting the stator housing to the rotor housing.

This kind of rotary connector device is fitted to a steering member close to the driver seat, and the rotary connector device should be designed to be free of noise. However, in the rotary connector device, the stator housing and the rotor housing are engaged rotatably and they slide on each other during the rotation. Since the attachment that connects the stator housing to the rotor housing slides, noises are caused depending on the accuracy of the attachment or its wear.

Moreover, in this kind of the rotary connector device, an intermediate cord is fixed to the housings in order to electrically connect the flexible cable in the housings to an external cable. This intermediate cord is fixed to the housings by using a component such as a binding belt or a heat-shrinkable tube in order to secure reliability of the rotary connector device. The prior art devices involve the problem that the number of components increases and the working factor is low, because the cord is fixed to the housing by using the component such as the binding belt or the heat-shrinkable tube as described above.

In addition, a steering wheel to which this type of rotary connector is mounted, is located adjacent the driver's sheet. Therefore, the rotary connector should be designed not to make abnormal sounds. In the aforementioned prior art rotary connector, the flexible cable is in direct contact with the inner wall of the housing and therefore the flexible cable may possibly make noises whenever the cable slides. An attempt was made to glue a slide sheet having a good sliding effect on the inner wall of the housing, so as to ensure smooth sliding property of the flexible cable to prevent the flexible cable from making noises whenever the cable slides. There was a groove in the boundary area between the slide sheet and the housings.

However, the above-disclosed prior art construction has potential problems. For example, bonding a slide sheet in an attempt to prevent development of slide noises needs a bonding agent and a bonding operation during assembly of the connector. In addition, the material of the housing and constituents of the bonding agent must be carefully selected in order to ensure good bonding effect over a long period of time. The flexible cable may drop in the groove between the slide sheet and the housing to be caught therein.

Moreover, there has been known a stator housing used for this type of rotary connector device, composed of two parts of a side housing and a bottom housing, and both housings are coupled by interfitting a fitting claw mounted on one of them with a fitting hold mounted on the other of them.

According to the above-mentioned prior art using the stator housing combined with the side housing and the bottom housing, there was undesirably a possibility that the bottom housing is decoupled from the side housing upon being applied with an external force against, for example, the bottom housing. Therefore, it was difficult to adapt such structure to enable the side housing and the bottom housing to be coupled by a snap fitting mechanism.

When the rotor housing and the stator housing cause mutual interference upon receiving an external force in this kind of the rotary connector device, offensive noise occurs due to this mutual interference. To prevent this interference, their axial dimensions are generally set so that the contact portion of the rotor housing with the stator housing can be sufficiently spaced apart from the stator housing.

However, when it is attached to a steering shaft portion of a car, for example, the rotary connector device must be placed into a limited space of the steering shaft portion with other combination switch devices, steering angle sensor, etc., and the rotary connector device is preferably thin. Accordingly, the increase of the size in the axial direction of the housing so as to prevent mutual interference between both housings creates yet another problem.

SUMMARY OF THE INVENTION

It is an object of the present invention to solve the existing problems with the prior art described above.

It is an object of the present invention to avoid the need for a large number of components in a cord fixing structure for reliably fixing an intermediate cord for electrically connecting a flexible cable in a housing to an external cable while maintaining a high working property. More particularly, it is an object to provide a cord fixing structure in a rotary connector device which does not need a large number of components to equip the housing firmly with an intermediate cord for electrically connecting a flexible cable in housings to an external cable, and which has a high working factor.

It is another object of the present invention to provide a housing interference prevention structure for a rotary connector device, which prevents mutual interference occurring between a rotor housing and a stator housing without increasing the size of the housings in an axial direction but contributes to the reduction of the thickness of the rotary connector device.

It is another object of the present invention to prevent occurrence of offensive noise from an attachment in a rotary connector device. More particularly, it is another object of the present invention to provide a grease groove structure in a rotary connector device that prevents the occurrence of offensive noise in the rotary connector device having a construction wherein a stator housing and a rotor housing are interconnected by an attachment.

It is yet another object of the present invention to provide a stator housing used for a rotary connector device in which any decoupling may be avoided upon being applied with external force, even if a combination structure that the side housing is coupled with the bottom housing by using the snap fitting mechanism is adopted.

It is yet another object of the present invention to eliminate use of a bonding agent when mounting the slide sheet to the housing and to eliminate a groove into which the flexible cable may fall. More particularly, it is an object to provide a construction for mounting a slide sheet to a rotary connector where a bonding agent is not needed when mounting the slide sheet to the housing and there is no groove into which the flexible cable may fall.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

In order to accomplish the objects described above, according to a first aspect of the present invention, the invention provides a cord fixing structure for a rotary connector device including a stator housing, a rotor housing rotatably fitted to the stator housing, and a flexible cable reeled in the space defined by both of the housings, wherein at least either the stator housing or the rotor housing has an opening through which a cord connected to the flexible cable is pulled outside, the opening having a plurality of bumps to clamp the cord. In a preferred embodiment, the present invention provides a cord fixing structure for a rotary connector device, in which the opening described above has a plurality of bumps to clamp the cord in a zigzag form.

According to a second aspect of the present invention, the invention provides a housing interference prevention structure for a rotary connector device including a stator housing, a rotor housing rotatably fitted to the stator housing, and a reeled flexible cable in the space defined by both housings, wherein the rotor housing has a lower contact portion whose outer border is higher than its center.

In a preferred embodiment, the present invention provides a housing interference prevention device for the rotary connector device, wherein the contact portion is inclined by a predetermined angle to the surface defined by the upper end of the stator housing.

According to a third aspect of the present invention, the invention provides a grease groove structure for a rotary connector device including a stator housing, a rotor housing rotatably fitted to the stator housing, and a reeled flexible cable in the space defined by both housings, wherein one of the housings is engaged with an attachment that rotatably holds the other, and a grease groove is disposed in the attachment where the housings make sliding contact. In a preferred embodiment, the present invention provides a grease groove structure in a rotary connector device, in which the grease groove is disposed in the rotating direction of the housings.

According to a fourth aspect of the present invention, the invention provides, in a rotary connector device including a stator housing, a rotor housing rotatably mounted on the stator housing and a flexible cable spirally received in the space formed by both of the housings, a stator housing structure in the rotary connector device, wherein the stator housing is composed of a side housing and a bottom housing, and respective base ends of the side housing and the bottom housing are aligned with each other.

In a preferred embodiment, the present invention includes a stator housing structure in the rotary connector device, wherein one of the side housing and the bottom housing has a fitting hole and the other of them has a fitting claw, and the side housing is coupled with the bottom housing by interfitting the fitting claw into the fitting hole.

According to a fifth aspect of the present invention, the invention provides a construction for mounting a slide sheet to a rotary connector. The construction comprises a stator housing, a rotor housing rotatably mounted to the stator housing, a flexible cable accommodated in a spiral form in the space defined by the two housings, and a slide sheet with which the flexible cable is in contact, wherein the stator housing has gaps positioned radially thereof and side edges of the slide sheet are inserted into said gaps.

In a preferred embodiment, the invention provides a construction for mounting a slide sheet to a rotary connector where the stator housing includes a side housing and a bottom housing, a first gap is defined at a connection where the side housing is connected to the bottom housing, and a first side edge of the slide sheet is inserted into the first gap.

In another embodiment, the invention provides a construction for mounting a slide sheet to a rotary connector where the stator housing includes a side housing and a bottom housing, at least one of the side housing and the bottom housing is provided with a guide for guiding the flexible cable, and the guide has a second gap into which a second side edge of the slide sheet is inserted.

In yet another embodiment, the present invention provides a construction for mounting a slide sheet to a rotary connector where the second gap extends through the guide.

BRIEF DESCRIPTION OF THE DRAWINGS

FIGS. 1(a) and 1(b) are views showing a preferred embodiment of the present invention, wherein FIG. 1(a) is a sectional view and FIG. 1(b) is a perspective view.

FIGS. 3(a) and 3(b) are views showing the bottom housing shown in FIG. 2, wherein FIG. 3(a) is a plan view when the bottom housing is viewed from the direction indicated by an arrow B in FIG. 2, and FIG. 3(b) is a detailed perspective view showing the insertion state of the second side of a sliding sheet into a guide portion of the bottom housing.

FIGS. 4(a) and 4(b) are plan views when the rotor housing and the stator housing are viewed from the side of a space for accommodating a flexible cable, wherein FIG. 4(a) shows the rotor housing and FIG. 4(b) shows the stator housing.

DETAILED DESCRIPTION OF THE PREFERRED EMBODIMENT

Figure 1:
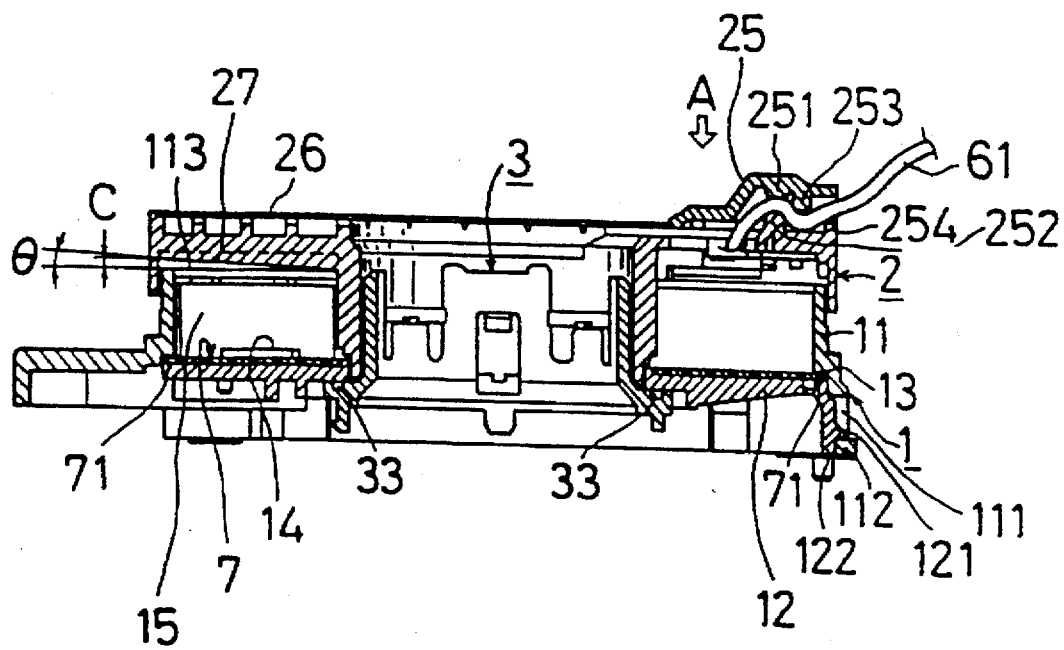
Figure 1:
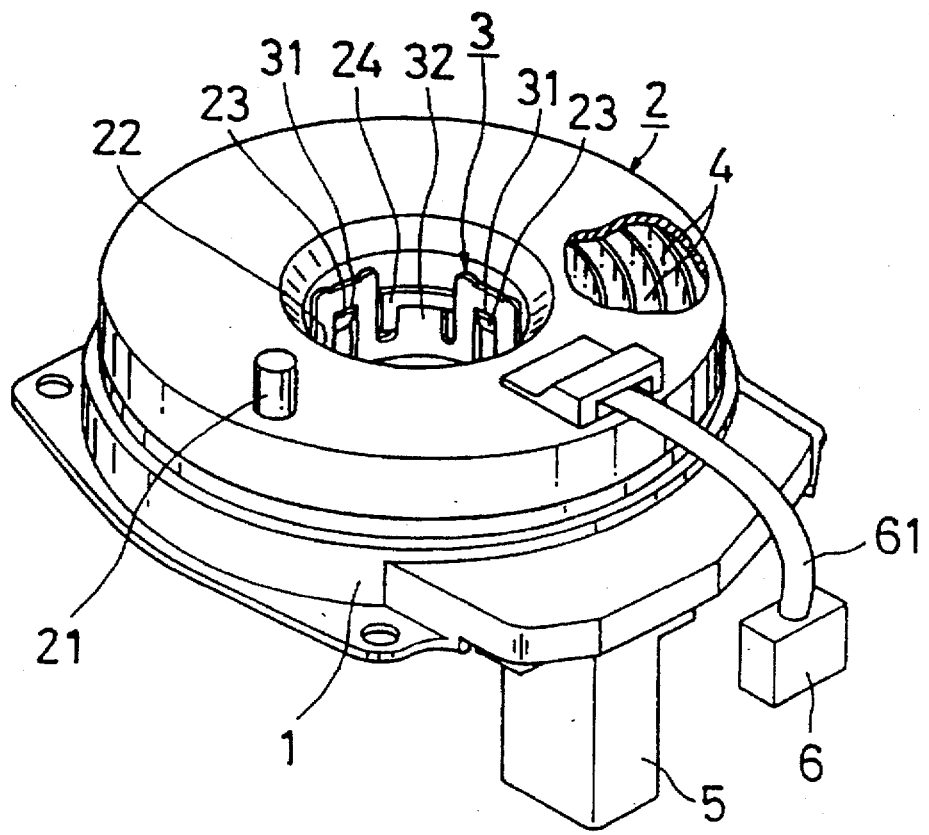
Figure 2:
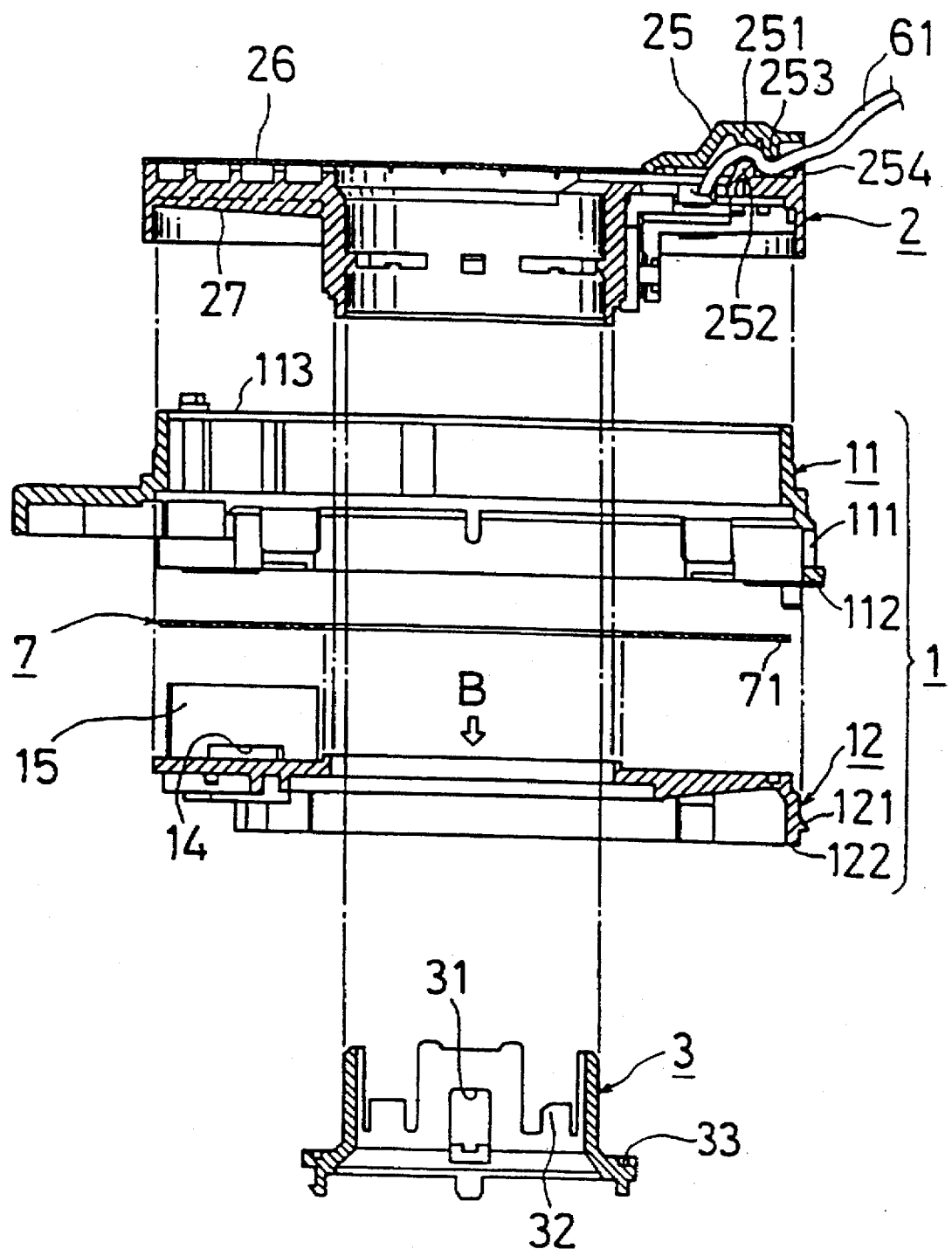
FIG. 2 is an exploded view of FIG. 1(a).
Figure 3:
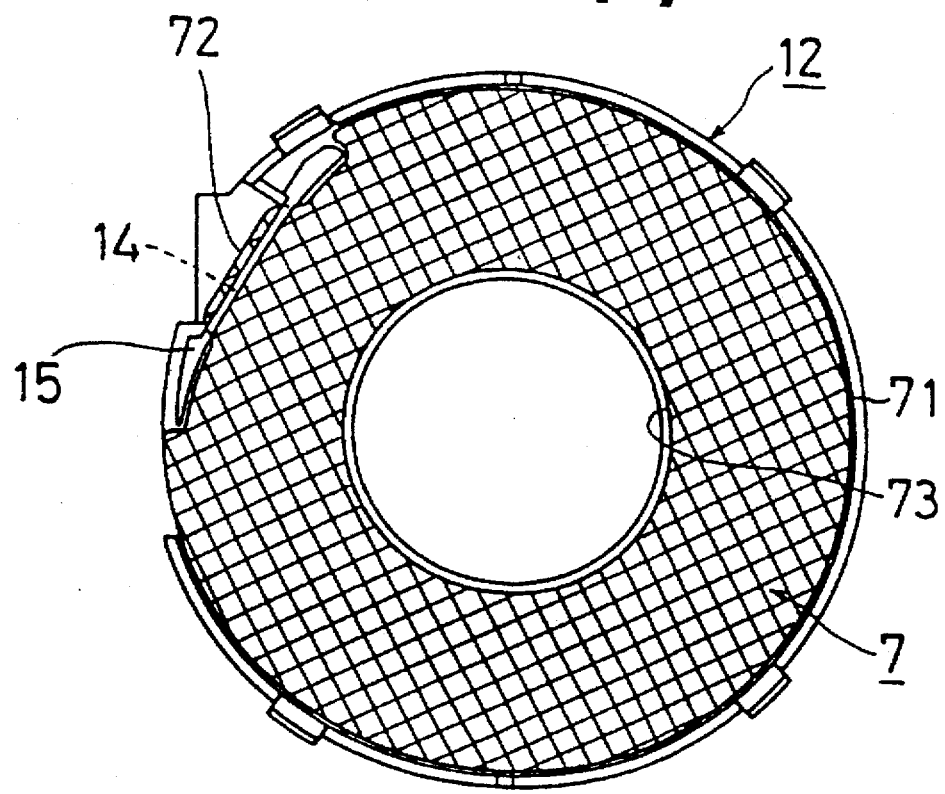
Figure 3:
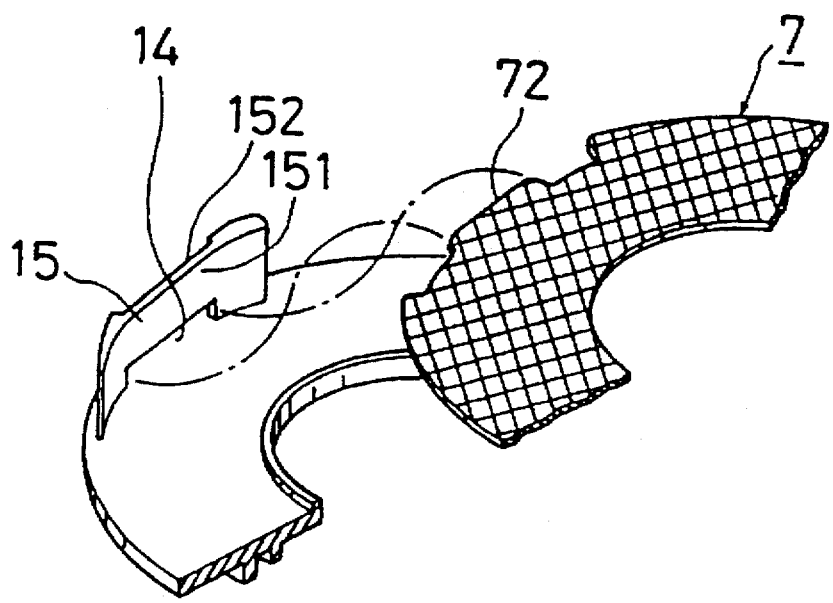
Figure 4:
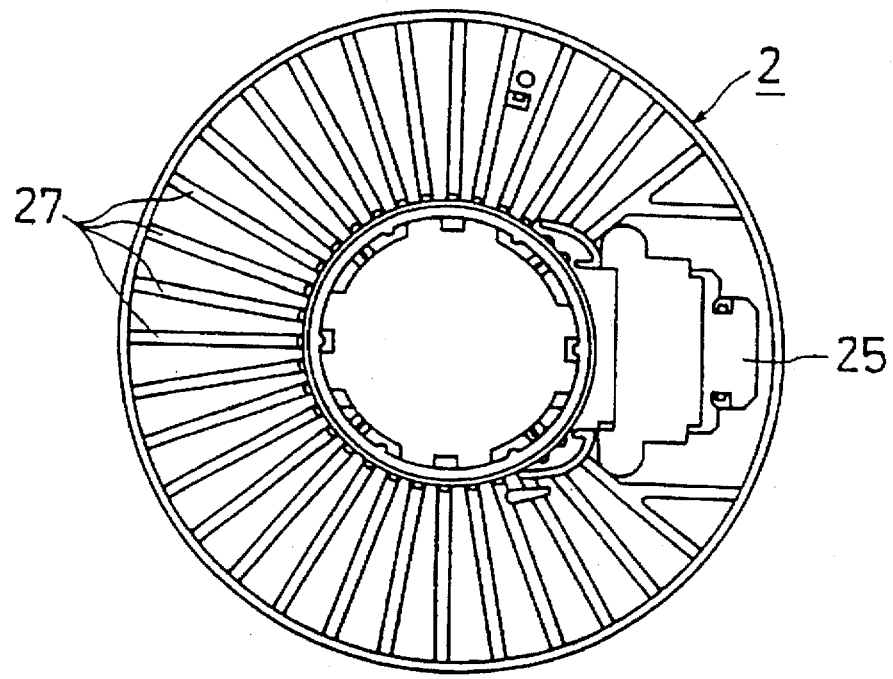
Figure 4:
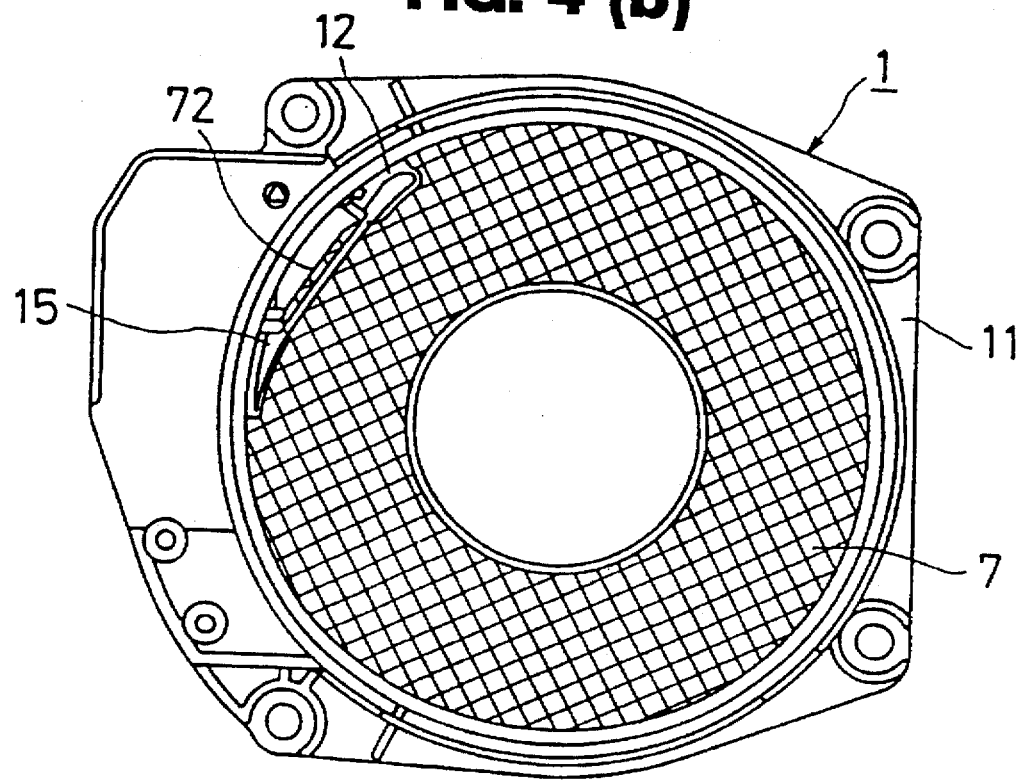

The accompanying drawings show a preferred embodiment of the present invention. However, a flexible cable 4 is not shown in the drawings other than FIG. 1(b).

In FIG. 1(b), reference numeral 1 denotes a stator housing, reference numeral 2 denotes a rotor housing, reference numeral 3 denotes an attachment, reference numeral 4 denotes a flexible cable, reference numerals 5 and 6 denote terminals, and reference numeral 7 denotes a sliding sheet. These members will be explained next.

First, the stator housing 1 is fixed to a combination switch (not shown) of a car, for example. The stator housing 1 comprises the combination of a side housing 11 and a bottom housing 12. In more detail, the side housing 11 includes fitting pawls 121, and when the fitting pawls 121 are fitted in the fitting holes 111, the side housing 11 is engaged with the bottom housing 12. Incidentally, the stator housing 1 may be constituted by integrally molding the side housing 11 and the bottom housing 12.

The side housing 11 and the bottom housing 12 have such dimensions that their base ends 112, 122 lie on the same plane, and when the stator housing 1 is fixed to the combination switch, their base ends 112, 122 come into contact with the combination switch. Accordingly, even when an external force acts on the bottom housing 12 from a direction indicated by an arrow A in FIG. 1(a), for example, the bottom housing 12 is prevented from deformation in the direction of the arrow A because its base end 122 comes into contact with the combination switch, thus preventing the fitting pawls 121 of the bottom housing 12 from leaving the fitting holes 111 of the side housing 11.

The stator housing 1 has a first gap 13 extending in a radial direction between the side housing 11 and the bottom housing 12, and the first side 71 of the sliding sheet 7 is inserted into this first gap 13.

The bottom housing 12 has a guide 15 that supports the end of the flexible cable 4 and guides the flexible cable 4 into the space defined by both housings 1, 2. The guide 15 has a first surface 151 on the side of the space for accommodating the reeled flexible cable 4, and a second surface 152 as the back of the first surface 151. A second gap 14 extends through between the first and second surfaces 151 and 152. The second side 72 of the sliding sheet 7 is inserted into the second gap 14.

The rotor housing 2 is rotatably fitted to the stator housing 1 and is the portion connected to the steering wheel (not shown) by a connecting pin 21.

The rotor housing 2 includes an inner border 22, on which are provided the pawls 23 fitting to the fitting portions 31 of the attachment 3 and the step portions 24 coming into contact with the protuberances of the attachment 3.

The rotor housing 2 is provided with an opening 25 in its upper port, through which a cord 61 of the terminal 6 is pulled outside, and a caution label 26 describing instructions on handling of the rotary connector device is affixed. The opening has a plurality of bumps 251 to 254 to clamp the cord 61. Accordingly, the cord 61 is firmly fixed to the rotor housing 2.

Further, the rotor housing 2 has a contact portion 27 on the side opposing the upper end 113 of the side housing 11, that is, on the lower side, and this contact portion 27 makes an angle 0 with respect to the plane defined by the upper end 113 of the side housing 11 as shown in FIG. 1(a). In other words, the contact portion 27 is higher on the outer border by about C=1 to 2 mm than on the center.

Next, the attachment 3 connects the housings 1, 2 to each other, and includes fitting portions 31 that are engaged resiliently with the pawls 23 of the rotor housing 2 and protuberances 32 coming into contact with the step portions 24 of the rotor housing 2. Further, the attachment 3 has a grease groove 33 formed in its surface in contact with the bottom housing 12 in the stator housing 1, and the grease groove is filled with grease to reduce the friction between the attachment 3 and the bottom housing 12.

The flexible cable 4 uses a flat cable having conductors sandwiched between a resin film. The flexible cable 4 is accommodated in the doughnut-like space defined between the stator housing 1 and the rotor housing 2. One end of the flexible cable 4 is electrically connected to the terminal 5 of the stator housing 1 and the other end to the terminal 6 of the rotor housing 2.

The sliding sheet 7 reduces the sliding friction of the flexible cable 4 when the flexible cable 4 slides inside the doughnut-like space defined by both housings 1, 2 and prevents the occurrence of offensive noise. The sheet is produced by shaping a polytetrafluoroethylene resin (PTFE) having excellent lubrication property into a doughnut shape. At least 80% of the outer periphery of this sheet is used as the first side 71 and the remaining portion of the outer periphery is used as the second side 72. Its inner periphery is used as the third side 73. Incidentally, the first and third sides 71, 73 form an arcuate shape and the second side 72 has an irregular shape suitable for the insertion into the second gap 14 formed in the guide 16.

The rotary connector device having the construction described above operates in the following way.

The terminal 6 of the rotary connector device is connected to the air bag device (not shown), for example, on the steering wheel side, and the other terminal 5 is connected to the air bag controller (not shown), for example, on the chassis. Accordingly, when a car accident occurs, for example, an electric signal from the air bag controller is transmitted to the air bag device of the steering pad, for example, through the flexible cable 4 of the rotary connector device, ignites the inflator, and causes the air bag to inflate.

According to the construction and the function described above, the present invention provides the following effects and advantages:

(1) At least either the stator housing or the rotor housing has the opening through which the cord connected to the flexible cable is pulled outside, and the opening has a plurality of bumps in it to clamp the cord. Accordingly, the housing is equipped with fewer components necessary for reliably fixing the intermediate cord for connecting electrically the flexible cable in the housing to the external cable, and the working factor is high.

(2) A plurality of bumps in the opening clamp the cord in the zigzag form. Accordingly, the cord can be fixed further reliably, and is not easily removed even when a pull force acts on the cord.

(3) Because the contact portion formed on the rotor housing is higher on the outer border than on the center, mutual interference between the rotor housing and the stator housing can be prevented without increasing the axial size of the housings. Therefore, the present invention can contribute to the reduction of the thickness of the rotary connector device, for example.

(4) Because the contact portion of the rotor housing is inclined by a predetermined angle to the plane defined by the upper end of the stator housing, the contact portion undergoes gentle deformation as a whole when the rotor housing receives the external force, and mutual interference occurring between the rotor housing and the stator housing can be smoothly prevented. Further, the problem that a specific portion of the contact portion protrudes and comes into contact with the flexible cable to damage it does not occur.

(5) The grease groove structure includes the attachment fitting to either the stator housing or the rotor housing and supporting rotatably the other, and the attachment has a grease groove in its face in contact with the housings. Therefore, the offensive noise does not occur from the attachment when both housings rotate relatively, and the grease is held in the groove. Accordingly, the occurrence of the offensive noise can be prevented for a long time.

(6) Since the grease groove is disposed in the rotating direction of the housings, the grease can spread over the surface where they make sliding contact.

(7) The stator housing is composed of the side housing and the bottom housing, the respective base ends of the side housing and the bottom housing are aligned with each other in a plane, and therefore the respective base ends are simultaneously in contact with, for example, the combination switch. Therefore, even if an external force is applied to the bottom housing, a resistance force against the external force is affected on the base ends thereby preventing the fitting claw from decoupling with respect to the fitting hole. As a result, a combination structure using a snap fitting mechanism can be utilized.

(8) One of the side housing and the bottom housing has a fitting hole and the other of them has a fitting claw, and the side housing is coupled with the bottom housing by interfitting the fitting claw into the fitting hole, and therefore the stator housing can be assembled by coupling the side housing with the bottom housing by one-touch operation.

(9) The stator housing has radially arranged gaps into which the side edges of the slide sheet are inserted. The slide sheet facilitates sliding movement of the flexible cable to prevent the flexible cable from making noises when the cable slides. The slide sheet may be fixedly mounted to the housing without having to use a bonding agent, thereby saving a stage for bonding the slide sheet when manufacturing. The slide sheet eliminates the need for selecting a proper material of the housing and the constituents of the bonding agent. There is no groove in the boundary area between the slide sheet and the housing, eliminating the problem that the flexible cable may be caught in a groove.

(10) The stator housing includes the side housing and the bottom housing. The first gap is defined at a connection where the side housing is connected to the bottom housing. The first side edge of the slide sheet is inserted into the first gap. This construction eliminates the need for a complex molding stage such as undercut for forming the first gap. The slide sheet may be inserted into the first gap through a simple operation where the slide sheet is placed on the bottom housing, then the side housing is placed on the slide sheet, and finally the side housing is fitted to the bottom housing.

(11) The stator housing includes the side housing and the bottom housing, at least one of the side housing and the bottom housing is provided with a guide for guiding the flexible cable, the guide has a second gap into which a second side edge of the slide sheet is inserted. Thus, even if the guide for guiding the flexible cable projects into the doughnut-like space defined by the stator housing and the rotor housing, there is no groove into which the flexible cable may fall. Thus, there is no possibility that the flexible cable may be caught by the guide. The guide helps position and fix the slide sheet in place.

(12) The guide has the second gap that extends therethrough. Thus, when molding the housings by means of a mold, the second gap may easily be formed by means of, for example, a slide mold. The guide provides the second gap having a sufficient depth into which the second side edge of the slide sheet is inserted.

The foregoing description of a preferred embodiment of the invention has been presented for purposes of illustration and description. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A rotary connector device having a construction for mounting a slide sheet, including a stator housing, a rotor housing rotatably mounted to the stator housing, a flexible cable accommodated in a spiral form in a space defined by the stator and rotor housings, and a slide sheet with which the flexible cable is in contact;

wherein the stator housing has gaps positioned radially thereof and side edges of the slide sheet are inserted into said gaps; and wherein said stator housing includes a side housing and a bottom housing, at least one of the side housing and the bottom housing is provided with a guide within the space defined by said housings for guiding the flexible cable, the guide has a second gap extending only partially about a circumference of said space defined by said housings into which a second side edge of the slide sheet is inserted.

2. The rotary connector device according to claim 1, wherein said second gap extends through the guide.

3. A rotary connector device according to claim 1, wherein said side housing is separate from said bottom housing, a first gap is defined between said side housing and said bottom housing at a connection where the side housing is connected to the bottom housing, and a first side edge of the slide sheet is inserted into the first gap.

4. A rotary connector device according to claim 1, wherein a top face of said rotor housing has an opening through which a cord connected to said flexible cable extends outside, said opening having a plurality of bumps to clamp said cord.

5. A rotary connector device according to claim 4, wherein said bumps clamp said cord in a zigzag form.

6. A rotary connector device according to claim 1, wherein said rotor housing has a contact portion on a side opposing said stator housing, and an outer border of said contact portion being higher than a center of said contact portion to prevent mutual interference between said rotor housing and said stator housing.

7. A rotary connector device according to claim 6, wherein said contact portion is inclined by a predetermined angle to a plane defined by an upper end of said stator housing.

8. A rotary connector device according to claim 1, wherein one of said housings is engaged with an attachment that rotatably holds the other, and a grease groove is disposed in said attachment adjacent to where said housings make sliding contact.

9. A rotary connector device according to claim 8, wherein said grease groove is disposed concentrically about an axis of rotation of said housings.

* * * * *